United States Patent
Burr et al.

(10) Patent No.: US 8,495,117 B2
(45) Date of Patent: Jul. 23, 2013

(54) SYSTEM AND METHOD FOR THE PARALLELIZATION OF SATURATED ACCUMULATION OPERATIONS

(75) Inventors: Alexander J. Burr, Longstanton (GB); Timothy M. Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1155 days.

(21) Appl. No.: 12/405,868

(22) Filed: Mar. 17, 2009

(65) Prior Publication Data
US 2010/0146020 A1    Jun. 10, 2010

Related U.S. Application Data

(60) Provisional application No. 61/120,216, filed on Dec. 5, 2008.

(51) Int. Cl.
*G06F 7/509* (2006.01)
*G06F 17/10* (2006.01)

(52) U.S. Cl.
USPC .......... 708/207; 708/208; 708/209; 708/490; 708/552

(58) Field of Classification Search
USPC .................. 708/207–209, 490, 552
See application file for complete search history.

(56) References Cited

U.S. PATENT DOCUMENTS

| 7,461,118 | B2 * | 12/2008 | Griessing | 708/552 |
|---|---|---|---|---|
| 7,853,637 | B2 * | 12/2010 | Papadantonakis et al. | 708/670 |
| 7,941,649 | B2 * | 5/2011 | Selvaggi et al. | 712/220 |
| 2007/0005676 | A1 * | 1/2007 | Henry | 708/552 |

* cited by examiner

*Primary Examiner* — Tammara Peyton
(74) *Attorney, Agent, or Firm* — Sterne, Kessler, Goldstein & Fox P.L.L.C.

(57) ABSTRACT

A system and method for parallelization of saturated accumulation is provided. In the method, an input sequence is divided into a plurality of subsequences. For each subsequence, three parallel saturating additions are performed. The local saturation minimum is the saturating addition of the global saturation minimum and the values of the subsequence. The local midpoint is the saturating addition of the values of the subsequence and the local saturation maximum is the saturating addition of the global saturation maximum and the values of the subsequence. In embodiments, the accumulation total for a subsequence is calculated as the saturating addition of the accumulation total for prior subsequences and the local midpoint of the current subsequence, wherein the accumulation total of the last subsequence is the result of the saturated accumulation for the sequence. In another embodiment, the saturated addition of subsequence results are further parallelized before the final result is reached.

27 Claims, 5 Drawing Sheets

SYSTEM AND METHOD FOR THE PARALLELIZATION OF SATURATED ACCUMULATION OPERATIONS

CROSS REFERENCE TO RELATED APPLICATIONS

The present application claims the benefit of U.S. Provisional Patent Application No. 61/120,216, filed Dec. 5, 2008, entitled "System and Method for the Parallelization of Saturated Accumulation Operations," which is incorporated herein by reference in its entirety.

FIELD OF THE INVENTION

The present invention relates generally to digital signal processing and specifically to speech compression and/or coding.

BACKGROUND OF THE INVENTION

Applications using ordinary arithmetic for a calculation typically make use of algebraic transformations of the calculation to render it in a form more convenient for efficient processing. The associative law, (a+b)+c=a+(b+c), allows ordinary arithmetic calculations to be parallelized. For example, a sum, e.g., a+b+c+d+e+f+g+h+i, can be rearranged as a set of subtotals:

(a+b+c) subtotal 1
+(d+e+f) subtotal 2
+(g+h+i) subtotal 3

Each subtotal can be computed in parallel, and then added together to reach the final result.

Many digital signal processing (DSP) algorithms utilize saturating arithmetic. For example, the International Telecommunications Union-Telecommunication Standardization Section (ITU-T) G.729 Recommendation defines an algorithm for encoding voice using Conjugate-Structure Algebraic-Code-Excited Linear-Prediction (CS-ACELP). The speech coding algorithm defined in Annex E of the G.729 Recommendation utilizes saturating arithmetic.

In saturating arithmetic, the result of a single addition is restricted to a defined range. This is typically referred to as 'saturating addition.' Saturating addition does not obey all the algebraic laws which ordinary addition does. Specifically, saturating addition does not obey the associative law described above. That is, the additions in the sum must be performed in linear order, with saturation applied to each stage. For example, the result of the saturating addition of the sequence, a+b+c+d, can be represented as:

result=sat(sat(sat(a+b)+c)+d)

The use of saturating arithmetic in G.729 as well as other DSP algorithms limits the ability to accelerate and/or improve the efficiency of these algorithms using parallel processing techniques.

What are therefore needed are systems and methods for the parallelization of saturated accumulation operations.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Method for Performing Parallelized Saturating Addition

Figure 1:
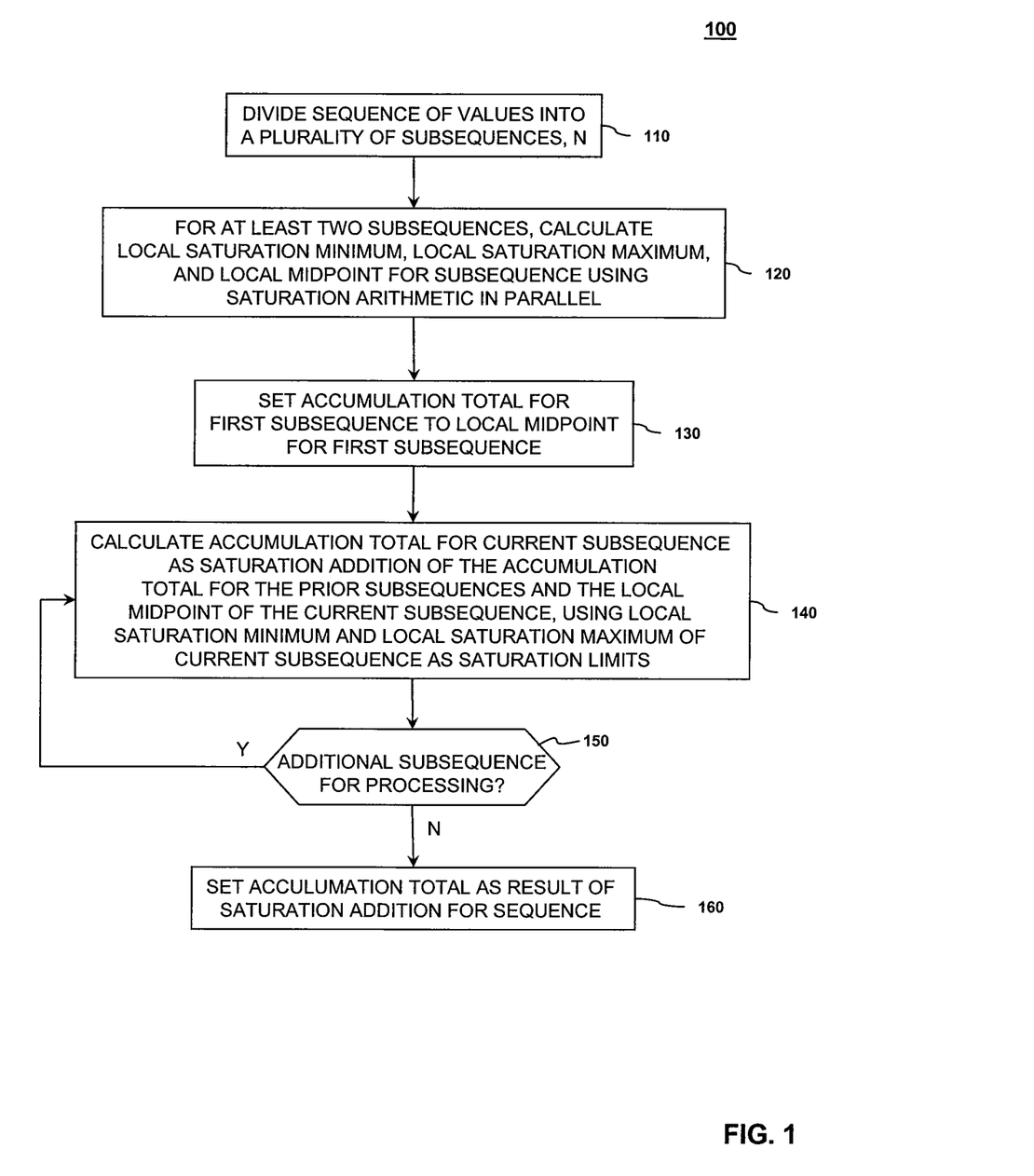
FIG. 1 illustrates a flowchart of an exemplary method for performing saturating accumulation of a sequence of values using parallel hardware units, according to embodiments of the present invention.

FIG. 1 illustrates a flowchart 100 of an exemplary method for performing saturating accumulation of a sequence of values using parallel hardware units, according to embodiments of the present invention.

In step 110, a sum having a sequence of values to be added is divided into a plurality of subsequences. For example, the following sum:

a+b+c+d+e+f+g+h+i can be divided into the following subsequences:

a+b+c subsequence 1
d+e+f subsequence 2
g+h+i subsequence 3

In step 120, a local saturation minimum, a local midpoint, and a local saturation maximum are calculated for each of at least two of the subsequences from step 110, using saturating arithmetic. Each of these calculations are performed in parallel in separate hardware units. In addition, the local saturation minimum and the local saturation maximum calculations are restricted to the same saturation range, defined by a global saturation minimum (MIN) and global saturation maximum (MAX). The local mid point calculation, however, is restricted to a saturation range that has twice the range defined by MIN and MAX, i.e. (MIN, MAX), and is defined as ((MIN−MAX), (MAX−MIN)).

The local saturation minimum for a subsequence is calculated as the saturating addition of the global saturation minimum and the input values of the subsequence. The local midpoint for a subsequence is calculated as the saturating addition of the input values of the subsequence. The local saturation maximum is calculated as the saturating addition of the global saturation maximum and the input values of the subsequence.

These three calculations can be represented by the following equations:

LOCAL_MIN[$i$]=MIN+$a$+$b$+$c$+

LOCAL_MID[$i$]=$a$+$b$+$c$+

LOCAL_MAX[$i$]=MAX+$a$+$b$+$c$+ where MIN (global saturation minimum) and MAX (global saturation maximum) are the values to which the addition saturates for the local saturation minimum and local saturation maximum calculations. As described above, these local calculations are performed in parallel. It should be noted, however, that the saturating additions for each calculation are performed sequentially, as required by saturating addition.

In digital signal processors (DSPs), values to be added together are often each the result of a multiply. For example, a Finite Impulse Response (FIR) commonly performs filtering of speech signals in modern voice codecs. An FIR can be represented by the following equation:

$$y(n) = \sum_{i=0}^{M-1} h(i)x(n-i);$$

$h(m)$ = filter coefficient, $x(n)$ = input sequence

For this reason, DSPs commonly include a multiply-accumulate instruction, MAC acc, x, y, which performs the calculation acc:=acc+x*y. Such instructions can also support saturating arithmetic. For one or more subsequences, step 120 can be implemented in the context of a multiply-accumulate instruction. In an embodiment, the multiply-accumulate instruction is used three times in software—once to calculate the local saturation minimum, once to calculate the local midpoint, and once to calculate the local saturation maximum. In an alternate embodiment, a multiply-accumulate instruction is provided with the facility to perform the three calculations. That is, the instruction:

MAC acc, x, y executes:

acc.low:=acc.low+$x*y$ acc.mid:=acc.mid+$x*y$ acc.high:=acc.high+$x*y$

In step 130, the initial accumulation total is set to the local midpoint for the first subsequence. That is:

acc_total=LOCAL_MID[1]

For the remaining steps processing moves from subsequence 2 through subsequence N.

In step 140, the accumulation total for the next subsequence is calculated as the saturating addition of the accumulation total for the prior subsequence(s) and the local midpoint of the next subsequence. The local saturation minimum and the local saturation maximum of the subsequence being processed are used as the saturation limits for the saturating addition of step 140.

In step 150, a determination is made whether additional subsequences remain to be processed. If additional subsequences remain to be processed, operation returns to step 140. Step 140 is repeated for each subsequence to be processed. If no additional subsequences remain to be processed, operation proceeds to step 160.

In step 160, the result is set to the final accumulation total calculated in step 140. Steps 140 through 160 can be represented by the following equations.

for i=2. . . N (where N is total number of subsequences to be processed)

acc_total=acc_total+LOCAL_MID[$i$]

if acc_total<LOCAL_MIN[$i$], then
 acc_total=LOCAL_MIN[$i$]

if acc_total>LOCAL_MAX[$i$], then
 acc_total=LOCAL_MAX[$i$]

Note that for the initial subsequence, subsequence 1, only the local midpoint is used in steps 130 and 140. Therefore, in an embodiment, the local saturation minimum and the local saturation maximum for the initial subsequence are not calculated in step 120.

The following is an example of the method described above for the sequence defined as −2, −3, 3, 2. The saturation range for the addition is defined as −4 and +4.

In ordinary saturating addition, the result would be reached by adding the sequence, in order, saturating at each stage to the saturation range −4, 4. This can be represented as:

result=sat(sat(sat((−2)+(−3))+3)+2)=1

Using the method described above, the saturating addition can be performed as two parallel sums of two subsequences. The partial result is then used to reach the final result for the sequence. The sequence, −2, −3, 3, 2 is first divided into two subsequences (−2, −3) and (3, 2). For each subsequence, the following three additions are performed, in parallel:

subsequence 1

LOCAL_MIN[0]=sat(sat(−4+−2)+−3)=−4

LOCAL_MID[0]=sat(−2+−3)=−5

LOCAL_MAX[0]=sat(sat(4+−2)+−3)=−1 subsequence 2

LOCAL_MIN[1]=sat(sat(−4+3)+2)=1

LOCAL_MID[1]=sat(3+2)=5

LOCAL_MAX[1]=sat(sat (4+3)+2)=4

The local saturation minimum calculations, LOCAL_MIN[i], and the local saturation maximum calculations, LOCAL_MAX[i], saturate to the range −4, 4. The local midpoint calculations, LOCAL_MID[i] saturate to a range twice that of the local minimum and local maximum calculations at −8, 8 (i.e. twice that of the global saturation range). The accumulation total for subsequence 1, acc_total[1], is set to the local midpoint of the subsequence, −5. The result for the sequence is then calculated as the addition of the accumulation total for subsequence 1 and the local midpoint of subsequence 2 saturated to the range defined by the local minimum and local maximum of subsequence 2. The result is calculated as:

result=acc_total[1]+LOCAL_MID[2]=(−5)+5=1 because 0 is smaller than the saturation minimum of subsequence 2, the result is set to saturation minimum, 1.

2. Architecture for Performing Parallelized Saturating Addition

The method described above produces exactly the same results as a sequence of saturating additions, while utilizing parallel hardware units. In an embodiment, the method is implemented completely in hardware. In an alternate embodiment, the method is implemented in software on a processor having parallel hardware units.

Figure 2:
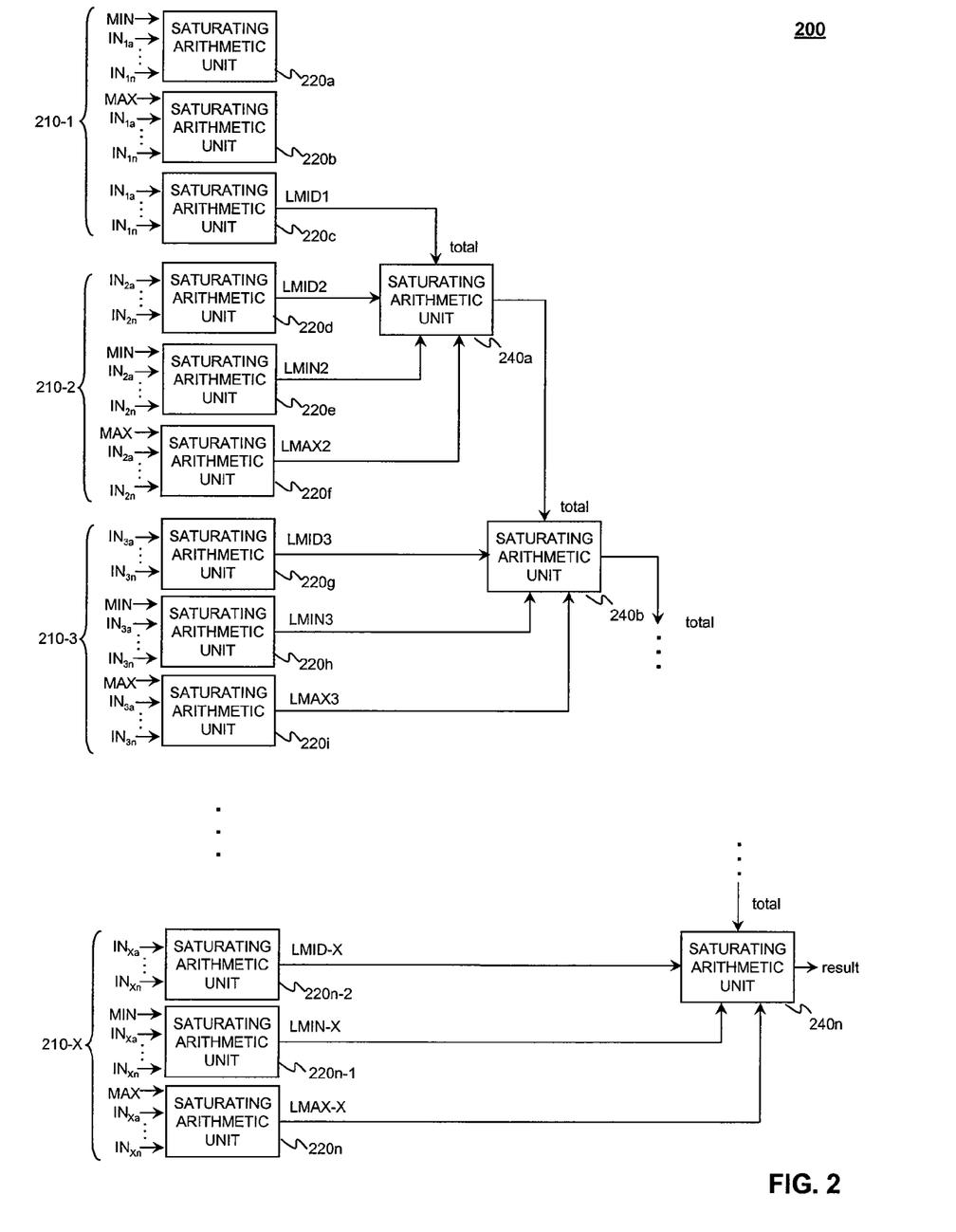
FIG. 2 depicts a high-level logical diagram of a system for implementing saturating accumulation using parallel hardware, according to embodiments of the invention.

FIG. 2 depicts a high-level logical diagram of a system 200 for implementing saturating accumulation using parallel hardware, according to embodiments of the invention. System 200 includes a plurality of first-level saturating arithmetic units 220a-n and one or more second-level saturating arithmetic units 240a-n.

First-level saturating arithmetic units 220a-n can be implemented in hardware, software, or a combination thereof. Second-level saturating arithmetic units 240a-n can be implemented in hardware, software, or a combination thereof.

Each first-level saturating arithmetic unit 220a-n receives at least two elements of an input sequence, IN, and optionally a global saturation minimum or global saturation maximum. A set 210 of three saturating arithmetic units (e.g., 220a-c) performs the saturating arithmetic described in step 120 for a single subsequence. The arithmetic units of the set 210 operate substantially in parallel. Each unit in the set receives the same elements of the input sequence at approximately the same time. One of the saturating arithmetic units (e.g., 220a) in the set receives the global saturation minimum as an additional input and calculates the local saturation minimum for the subsequence. Another one of the saturating arithmetic units (e.g., 220b) in the set receives the global saturation maximum as an additional input and calculates the local saturation maximum for the subsequence. The final one of the saturating arithmetic units (e.g., 220c) in the set calculates the local midpoint for the subsequence.

Note that because only the local midpoint of the first subsequence is required as input to the second-level saturating arithmetic unit 240, the set 210-1 of saturating arithmetic units processing the first subsequence can only include a single saturating arithmetic unit.

In an embodiment, at least two sets of saturating arithmetic units are performing saturating arithmetic operations on subsequences substantially in parallel. In the example of FIG. 2, set 210-1, including saturating arithmetic units 220a-c, is processing subsequence 1 while set 210-2, including saturating arithmetic units 220d-f, is processing subsequence 2, substantially in parallel with the processing being performed by set 210-1.

The number of first-level saturating arithmetic units 220a-n provided in system 200 is dependent upon the number of subsequences being processed in parallel. At a minimum, it is advantageous to process two subsequences in parallel. Thus, in an embodiment, at least four first-level saturating arithmetic units 220 (a single unit 220 for calculating the local midpoint of a first subsequence and three units 220 for calculating the local minimum, local midpoint and local maximum for a second subsequence) are provided for parallel processing. However, additional or fewer units can be provided as required by an application.

Each second-level saturating arithmetic unit 240a-n produces an accumulation total for a subsequence, as described in step 140 above. In order to calculate the accumulation total, the second-level saturating arithmetic units 240a-n receive an accumulation total from either another second-level unit 240a-n or from the first set 210-1 of saturating arithmetic units. The accumulation total represents the partial result of the additions of the subsequences prior to the current subsequence being processed. The second-level units 240a-n also receive the local midpoint, local saturation minimum and local saturation maximum calculated for the current subsequence by the set 210 of first-level saturating arithmetic units 220. The local saturation minimum and local saturation maximum are used by the second level units 240a-n as the saturation range for the saturating addition of the accumulation total for the prior subsequence(s) and local midpoint for the current subsequence.

In the example of FIG. 2, second-level saturating arithmetic unit 240a receives the accumulation total for subsequence 1 (i.e., local midpoint for subsequence) from saturating arithmetic unit 220c, the local midpoint for subsequence 2 from saturating arithmetic unit 220d, the local saturation minimum for subsequence 2 from saturating arithmetic unit 220e, and the local saturation maximum for subsequence 2 from saturating arithmetic unit 220f. Second-level arithmetic unit 240a adds the received accumulation total to the received local midpoint for subsequence 2, saturating to the received local saturation minimum and maximum. Second-level saturating arithmetic unit 240a produces the accumulation total for subsequences 1 and 2 which is used as input to saturating arithmetic unit 240b.

In the example of FIG. 2, second-level saturating arithmetic unit 240b receives the accumulation total for the prior processed subsequences (i.e., subsequences 1 and 2) from second-level saturating arithmetic unit 240a, the local midpoint for subsequence 3 from saturating arithmetic unit 220g, the local saturation minimum for subsequence 3 from saturating arithmetic unit 220h, and the local saturation maximum for subsequence 3 from saturating arithmetic unit 220i. Second-level arithmetic unit 240b adds the received accumulation total for subsequences 1 and 2 to the received local midpoint for subsequence 3, saturating to the received local saturation minimum and maximum. Second-level saturating arithmetic unit 240b produces the accumulation total for subsequences 1, 2, and 3 which is used as input to a subsequent saturating arithmetic unit. Second-level saturating arithmetic units are logically arranged in this manner until all subsequences have been processed.

Although FIG. 2 depicts second-level saturating arithmetic units 240 as separate units, as would be appreciated by persons of skill in the art, the same physical saturating arithmetic unit can be used as one or more of the second-level saturating arithmetic units represented in FIG. 2. Additionally, as would be appreciated by a person of skill in the art, a first-level saturating arithmetic unit can be used as a second-level processing unit when not performing the processing of step 120.

One or more sets of first-level saturating arithmetic units 210 can be implemented using a saturating multiply-accumulator (MAC) unit. As described above, step 120 can be implemented in the context of a multiply-accumulate instruction to be executed by a MAC unit. In an embodiment, the multiply-accumulate instruction is used three times in software—to calculate the local midpoint, local saturation minimum, and local saturation maximum. In an alternate embodiment, a multiply-accumulate instruction is provided with the facility to perform all three calculations.

Although FIG. 2 depicts first-level saturating arithmetic units 210 as comprising three separate saturating arithmetic units (e.g., 220a, 220b, and 220c), as would be appreciated by persons of skill in the art, a single saturating arithmetic unit can be used to sequentially calculate the local midpoint, local saturation minimum, and local saturation maximum. Even further, as would be appreciated by persons of skill in the art, first-level saturating arithmetic units 210 can comprise two saturating arithmetic units to calculate the local midpoint, local saturation minimum, and local saturation maximum. For example, a first one of the two saturating arithmetic units can be used to calculate the local midpoint, while the second one of the two saturating arithmetic units can be used to calculate the local saturation minimum and the local saturation maximum in a sequential manner. The two saturating arithmetic units can perform these calculations in parallel.

3. Method for Performing Parallelized Saturating Addition of Subtotals

As illustrated by the method of FIG. 1, the saturating addition of a series of values can be divided into series of subsequences. The saturated addition of each subsequence can, in turn, be performed in parallel. The parallel saturated addition of a subsequence results in a subtotal that can be represented by three values: LOCAL_MIN[i], LOCAL_MID[i], and LOCAL_MAX[i]. For explanation purposes, the subtotal results for each subsequence can be represented as an array of triple values, LOCAL[i], as follows:

$$LOCAL[i]=(LOCAL\_MIN[i], LOCAL\_MID[i], LOCAL\_MAX[i])$$

However, the method of FIG. 1 does not provide further parallelization of subtotals represented in the triple form LOCAL[i].

Figure 3:
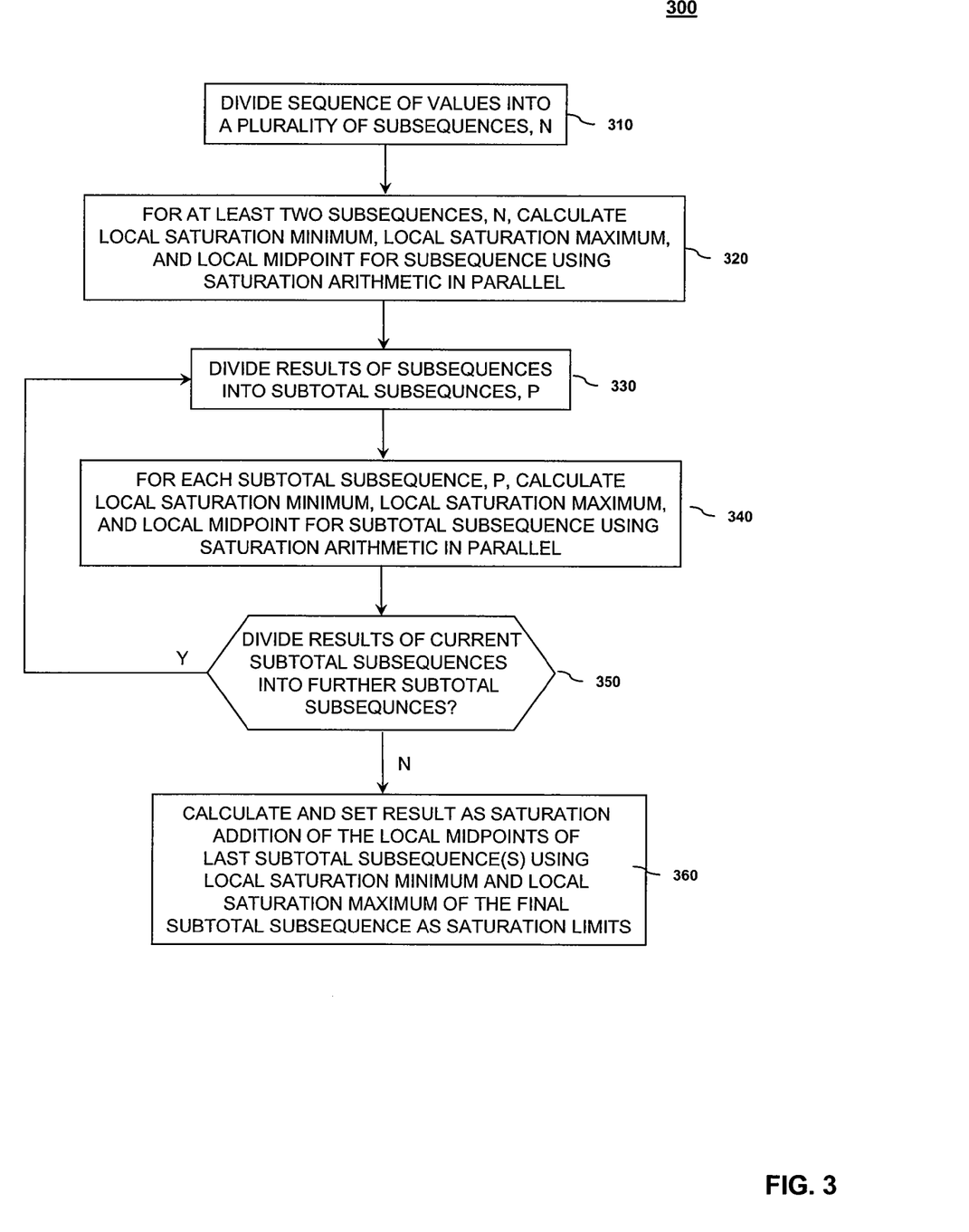
FIG. 3 illustrates a flowchart of an exemplary method for performing saturating accumulation of a sequence of values and subtotals using parallel hardware units, according to embodiments of the present invention.

FIG. 3 expands on the method of FIG. 1, and further illustrates an exemplary method 300 for parallel saturated addition of subtotals represented in the triple form LOCAL[i]. The parallel saturated addition of subtotals described by method 300 can be performed on subtotal subsequences consisting of two subtotals. Method 300 can reduce the execution length for a saturating addition of N values from order O(N) to $O(Log_2(N))$.

In step 310 of method 300, a sum having a sequence of values to be added is divided into a plurality of subsequences. For example, the following sum:

$$a+b+c+d+e+f+g+h$$

can be divided into the following subsequences:
a+b subsequence 1
c+d subsequence 2
e+f subsequence 3
g+h subsequence 4

In step 320, a local saturation minimum, a local midpoint, and a local saturation maximum are calculated for each of at least two of the subsequences from step 310, using saturating arithmetic. Each of these calculations are performed in parallel in separate hardware units. In addition, the local saturation minimum and the local saturation maximum calculations are restricted to the same saturation range, defined by a global saturation minimum (MIN) and a global saturation maximum (MAX). The local mid point calculation, however, is restricted to a saturation range that has twice the range defined by MIN and MAX, i.e. (MIN, MAX), and is defined as ((MIN−MAX), (MAX−MIN)).

The local saturation minimum for a subsequence is calculated as the saturating addition of the global saturation minimum and the input values of the subsequence. The local midpoint for a subsequence is calculated as the saturating addition of the input values of the subsequence. The local saturation maximum is calculated as the saturating addition of the global saturation maximum and the input values of the subsequence.

These three calculations can be represented by the following equations:

$$LOCAL\_MIN[k][i]=MIN+a+b+c+$$

$$LOCAL\_MID[k][i]=a+b+c+$$

$$LOCAL\_MAX[k][i]=MAX+a+b+c+$$

As described above, these local calculations are performed in parallel. Since there can be numerous stages of parallelization, the variable k is introduced to represent to which stage of parallelization the local results belong. The variable i represents a subsequence within a parallel stage of the saturating addition. It should be noted that steps 310 and 320 of FIG. 3 are substantially the same as steps 110 and 120 illustrated in FIG. 1.

For explanation purposes, the subtotals (i.e. results) for each subsequence can be represented as an array of triple values, LOCAL[k][i], as follows:

$$LOCAL[k][i]=(LOCAL\_MIN[k][i], LOCAL\_MID[k][i], LOCAL\_MAX[k][i])$$

The method illustrated in FIG. 1 would proceed at this point to sequentially accumulate the subtotals of each subsequence, LOCAL[k][i], to produce a final result. The method illustrated in FIG. 3, however, expands on the method of FIG. 1 to further parallelize the accumulation of subtotals represented in the form LOCAL[k][i].

In step 330, the subtotals LOCAL[k][i] to be accumulated are further divided into a plurality of subtotal subsequences consisting of two subtotals. For example, LOCAL[1][1]+LOCAL[1][2]+LOCAL[1][3]+LOCAL[1][4] can be further divided into the following subtotal subsequences:

LOCAL[1][1]+LOCAL[1][2] subtotal subsequence 1

LOCAL[1][3]+LOCAL[1][4] subtotal subsequence 2

In step 340, a local saturation minimum, a local midpoint, and a local saturation maximum are calculated for each of the subtotal subsequences using saturating arithmetic. Each of these calculations are performed in parallel in separate hardware units. In addition, the local saturation minimum and the local saturation maximum calculations are restricted to the local saturation minimum and local saturation maximum defined by the subtotal LOCAL[k][i] occurring last sequentially within a subtotal subsequence. For example, the local saturation minimum and the local saturation maximum calculations performed in the saturated addition of subtotal subsequence 1, will be restricted to the local saturation minimum and local saturation maximum defined by subtotal LOCAL[1][2] (which occurs last sequentially among the subtotal results in subsequence 1). The local midpoint calculation is restricted to a saturation range that has twice the range defined by the global saturation minimum, MIN, and the global saturation maximum, MAX, i.e. (MIN, MAX), and is defined as ((MIN−MAX), (MAX−MIN)).

The local saturation minimum for a subtotal subsequence is calculated as the saturating addition of the local minimum for the first occurring local subtotal and the midpoint for the last occurring local subtotal. The local midpoint for a subtotal subsequence is calculated as the saturating addition of the midpoint values of the subtotals within the subsequence. The local saturation maximum for a subtotal is calculated as the saturating addition of the local maximum for the first occurring local subtotal and the midpoint for the last occurring local subtotal.

These three calculations can be represented by the following equations:

$$LOCAL\_MIN[k][i]=LOCAL\_MIN[k-1][(2i)-1]+LOCAL\_MID[k-1][2i]$$

$$LOCAL\_MID[k][i]=LOCAL\_MID[k-1][(2i)-1]+LOCAL\_MID[k-1][2i]$$

$$LOCAL\_MAX[k][i]=LOCAL\_MAX[k-1][(2i)-1]+LOCAL\_MID[k-1][2i]$$

As described above, these local subtotal calculations are performed in parallel.

In step 350, a determination is made whether additional division of the subtotal results, most recently calculated, can occur. If parallelization is determined to yield further benefit, steps 330 and 340 are repeated. In one embodiment, if there are more than 3 subtotal results remaining, further division occurs with repetition of steps 330 and 340. In another embodiment, if exactly three subtotal results remain, the subtotals can be added linearly as illustrated in the method of FIG. 1.

Assuming only two results remain, method 300 proceeds to step 360. In step 360, the final result is calculated as the saturating addition of the local midpoint of the two remaining subtotal results, LOCAL[k][i], saturated to the local minimum and local maximum defined by the subtotal result which occurs last sequentially.

The following is an example of the method described above for the sequence defined as $-2, -1, -3, 2, -2, 4, 1, 3$. The global saturation range for the addition is defined as $-4$ and $+4$, i.e. $(-4, 4)$.

In ordinary saturating addition, the result would be reached by adding the sequence, in order, saturating at each state to the saturation range $-4, 4$. This can be represented as:

$$\text{result}=\text{sat}(\text{sat}(\text{sat}(\text{sat}(\text{sat}(\text{sat}(\text{sat}(-2+1)+-3)+2)+-2)+4)+1)+3)$$

Using the method described in FIG. 3, the saturating addition can be performed as four parallel sums of four subsequences. The four parallel sums would result in four subtotal results, which can be further divided into two subtotal subsequences. The two parallel sums of the subtotal subsequences would ultimately be used to reach the final result for the initial sequence of values. The sequence, $-2, -1, -3, 2, -2, 4, 1, 3$ is first divided into four subsequences $(-2, 1), (-3, 2), (-2, 4)$ and $(1, 3)$. For each subsequence the following three additions are performed, in parallel:

subsequence 1

$\text{LOCAL\_MIN}[1][1]=\text{sat}(\text{sat}(-4+-2)+-1)=-4$ $\text{LOCAL\_MID}[1][1]=\text{sat}(-2+-1)=-3$ $\text{LOCAL\_MAX}[1][1]=\text{sat}(\text{sat}(4+-2)+-1)=1$ subsequence 2

$\text{LOCAL\_MIN}[1][2]=\text{sat}(\text{sat}(-4+-3)+2)=-2$ $\text{LOCAL\_MID}[1][2]=\text{sat}(-3+2)=-1$ $\text{LOCAL\_MAX}[1][2]=\text{sat}(\text{sat}(4+-3)+2)=3$ subsequence 3

$\text{LOCAL\_MIN}[1][3]=\text{sat}(\text{sat}(-4+-2)+4)=0$ $\text{LOCAL\_MID}[1][3]=\text{sat}(-2+4)=2$ $\text{LOCAL\_MAX}[1][3]=\text{sat}(\text{sat}(4+-2)+4)=4$ subsequence 4

$\text{LOCAL\_MIN}[1][4]=\text{sat}(\text{sat}(-4+1)+3)=0$ $\text{LOCAL\_MID}[1][4]=\text{sat}(1+3)=4$ $\text{LOCAL\_MAX}[1][4]=\text{sat}(\text{sat}(4+1)+3)=4$ The local saturation minimum calculations, LOCAL_MIN[1][i] and the local saturation maximum calculations, LOCAL_MAX[1][i], saturate to the range $-4, 4$. The local midpoint calculations, LOCAL_MID[1][i] saturate to a range twice that of the local minimum and local maximum calculations at $-8, 8$ (i.e. twice that of the global saturation range).

Again, for explanation purposes, local subtotals for each of the above subsequences, 1-4, can be represented as a triple value of the form:

$$\text{LOCAL}[k][i]=(\text{LOCAL\_MIN}[k][i], \text{LOCAL\_MID}[k][i], \text{LOCAL\_MAX}[k][i])$$

The local subtotal results for each subsequence, LOCAL[1][1], LOCAL[1][2], LOCAL[1][3] and LOCAL[1][4], would be further divided into two subtotal subsequences (LOCAL[1], LOCAL[2]) and (LOCAL[3], LOCAL[4]), each consisting of two subtotals. For each subtotal subsequence, the following three additions are performed, in parallel:

subtotal subsequence 1—(LOCAL[1][1], LOCAL[1][2])

$\text{LOCAL\_MIN}[2][1]=\text{sat}(-4+-1)=-2$ $\text{LOCAL\_MID}[2][1]=\text{sat}(-3+-1)=-4$ $\text{LOCAL\_MAX}[2][1]=\text{sat}(1+-1)=0$ subtotal subsequence 2—(LOCAL[1][3], LOCAL[1][4])

$\text{LOCAL\_MIN}[2][2]=\text{sat}(0+4)=4$ $\text{LOCAL\_MID}[2][2]=\text{sat}(2+4)=6$ $\text{LOCAL\_MAX}[2][2]=\text{sat}(4+4)=4$ The local saturation minimum calculations, LOCAL_MIN[k][i], and the local saturation maximum calculations, LOCAL_MAX[k][i], saturate to the local saturation minimum and local saturation maximum defined by the subtotal LOCAL[k][i] occurring last sequentially within a subtotal sequence. For example, the local saturation minimum and the local saturation maximum calculations performed in the saturated addition of subtotal subsequence 1, will be restricted to the local saturation minimum and local saturation maximum defined by subtotal LOCAL[1][2] (which occurs last sequentially among the subtotal results in subtotal subsequence 1). The local midpoint calculations, LOCAL_MID[k][i], saturate to a range $-8, 8$, which is twice the range defined by the global maximum, MAX, and global minimum, MIN.

The final result is calculated as the saturating addition of the local midpoints of the two remaining subtotal subsequence results, LOCAL_MID[2][1] and LOCAL_MID[2][2], saturated to the local minimum and local maximum defined by the subtotal subsequence result which occurs last sequentially, i.e. LOCAL_MIN[2][2] and LOCAL_MAX[2][2]. The result is calculated as: result=LOCAL_MID[2][1]+LOCAL_MID[2][2]=(-4)+6=4, because $-2$ is smaller than the saturation minimum of subtotal subsequence 2, the result is set to saturation minimum, 4.

4. Architecture for Performing Parallelized Saturating Addition of Subtotals

The method of FIG. 3 described above produces exactly the same results as a sequence of saturating additions, while utilizing parallel hardware units. In an embodiment, the method is implemented completely in hardware. In an alternate embodiment, the method is implemented in software on a processor having parallel hardware units. Using the above method, the execution length for a saturating addition of length N values, can be reduced from order $O(N)$ to $O(\log_2(N))$.

Figure 4:
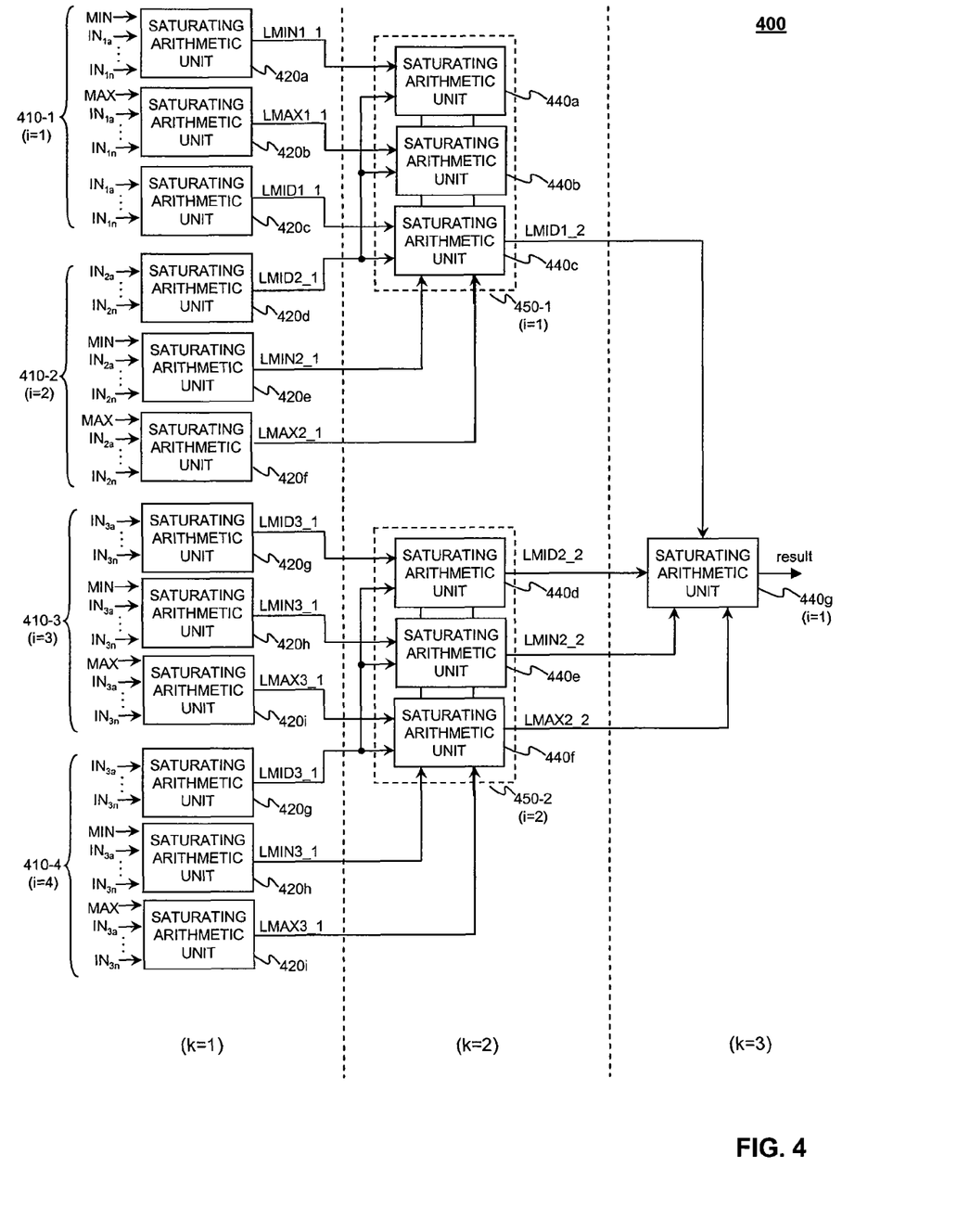
FIG. 4 depicts a high-level logical diagram of a system for implementing saturating accumulation using multiple levels of parallel hardware, according to embodiments of the invention.

FIG. 4 depicts a high-level logical diagram of a system 400 for implementing saturating accumulation using parallel hardware, according to embodiments of the invention. System 400 includes a plurality of first-level saturating arithmetic units 420a-i, and a plurality of second-level saturating arithmetic units 440a-f.

First-level saturating arithmetic units 420a-i can be implemented in hardware, software, or a combination thereof. Second-level saturating arithmetic units 440a-f can be implemented in hardware, software, or a combination thereof.

Each first-level saturating arithmetic unit 420 receives at least two elements of an input sequence, IN, and optionally a global saturation minimum or global saturation maximum. A set 410 of three saturating arithmetic units (e.g., 420a-c) performs the saturating arithmetic described in step 320 for a single subsequence. The arithmetic units of the set 410 operate substantially in parallel. Each unit in the set receives the same elements of the input sequence at approximately the same time. One of the saturating arithmetic units (e.g., 420a) in the set receives the global saturation minimum as an additional input and calculates the local saturation minimum for the subsequence. Another one of the saturating arithmetic units (e.g., 420b) in the set receives the global saturation maximum as an additional input and calculates the local saturation maximum for the subsequence. The final one of the saturating arithmetic units (e.g., 420c) in the set calculates the local midpoint for the subsequence.

Note that because only the local midpoint of the first subsequence is required as input to the second-level saturating arithmetic unit 440, the set 410-1 of saturating arithmetic units processing the first subsequence can only include a single saturating arithmetic unit.

In an embodiment, at least two sets of saturating arithmetic units are performing saturating arithmetic operations on subsequences substantially in parallel. In the example of FIG. 4, set 410-1, including saturating arithmetic units 420a-c, is processing subsequence 1 while set 410-2, including saturating arithmetic units 420d-f, is processing subsequence 2, substantially in parallel with the processing being performed by set 410-1.

The number of first-level saturating arithmetic units 420 provided in system 400 is dependent upon the number of subsequences being processed in parallel. At a minimum, it is advantageous to process two subsequences in parallel. Thus, in an embodiment, at least four first-level saturating arithmetic units 420 (a single unit 420 for calculating the local midpoint of a first subsequence and three units 420 for calculating the local minimum, local midpoint and local maximum for a second subsequence) are provided for parallel processing. However, additional or fewer units can be provided as required by an application.

Second-level saturating arithmetic units 440 are provided for further parallel processing of subtotal subsequences produced by first-level saturating arithmetic unit sets, as described in step 340 above. In a similar manner as first-level saturating arithmetic unit sets 410, a set 450 of three second-level saturating arithmetic units (e.g., 440a-c) perform the saturating arithmetic described in step 340 for a single subtotal subsequence, wherein a subtotal is represented in the form of a triple value consisting of a local saturation minimum, a local midpoint, and a local maximum value. The arithmetic units of the set 450 operate substantially in parallel. Each unit in the set receives the local midpoint of the input subtotal that occurs last sequentially within the subtotal subsequence. One of the saturating arithmetic units (e.g., 440a) in the set receives the local saturation minimum for the first occurring subtotal as an additional input and calculates the local saturation minimum for the subtotal subsequence. Another one of the saturating arithmetic units (e.g., 440b) in the set receives the local maximum for the first occurring subtotal as an additional input and calculates the local midpoint for the subtotal subsequence. The final one of the saturating arithmetic units (e.g., 440c) in the set receives the local saturation maximum for the first occurring subtotal as an additional input and calculates the local saturation maximum for the subtotal subsequence.

Note that because only the local midpoint of the first subtotal subsequence is required as input to the third-level saturating arithmetic unit 440g, the set 450-1 of saturating arithmetic units processing the first subtotal subsequence can only include a single saturating arithmetic unit.

In an embodiment, at least two sets of saturating arithmetic units are performing saturating arithmetic operations on subtotal subsequences substantially in parallel. In the example of FIG. 4, set 450-1, including saturating arithmetic units 440a-c, is processing subtotal subsequence 1 while set 450-2, including saturating arithmetic units 420d-f, is processing subtotal subsequence 2, substantially in parallel with the processing being performed by set 450-1.

The number of second-level saturating arithmetic units 440 provided in system 400 is dependent upon the number of subtotal subsequences being processed in parallel. At a minimum, it is advantageous to process two subtotal subsequences in parallel. Thus, in an embodiment, at least four second-level saturating arithmetic units 440 (a single unit 440 for calculating the local midpoint of a first subtotal subsequence and three units 440 for calculating the local minimum, local midpoint and local maximum for a second subtotal subsequence) are provided for parallel processing. However, additional or fewer units can be provided as required by an application.

In the example of FIG. 4, second-level saturating arithmetic unit 440g receives the subtotals for the prior processed subtotal subsequences from second-level saturating arithmetic unit sets 450-1 and 450-2. Second-level arithmetic unit 440g adds the received local midpoints for subtotal subsequences 1 and 2, saturating to the received local saturation minimum and maximum of subtotal subsequence 2. The saturated addition of the final two midpoints produces the final result.

Although FIG. 4 depicts second-level saturating arithmetic units 450 as comprising three separate saturating arithmetic units (e.g., 440a, 440b, and 440c), as would be appreciated by persons of skill in the art, a single saturating arithmetic unit can be used to sequentially calculate the local midpoint, local saturation minimum, and local saturation maximum. Even further, as would be appreciated by persons of skill in the art, second-level saturating arithmetic units 450 can comprise two saturating arithmetic units to calculate the local midpoint, local saturation minimum, and local saturation maximum. For example, a first one of the two saturating arithmetic units can be used to calculate the local midpoint, while the second one of the two saturating arithmetic units can be used to calculate the local saturation minimum and the local saturation maximum in a sequential manner. The two saturating arithmetic units can perform these calculations in parallel.

One or more set of first-level saturating arithmetic units 410 can be implemented using a saturating multiply-accumulator (MAC) unit. As described above, step 320 can be implemented in the context of a multiply-accumulate instruction to be executed by a MAC unit. In an embodiment, the multiply-accumulate instruction is used three times in software—to calculate the local midpoint, local saturation minimum, and local saturation maximum. In an alternate embodiment, a multiply-accumulate instruction is provided with the facility to perform all three calculations.

Although FIG. 4 depicts first-level saturating arithmetic units 410 as comprising three separate saturating arithmetic units (e.g., 420a, 420b, and 420c), as would be appreciated by persons of skill in the art, a single saturating arithmetic unit can be used to sequentially calculate the local midpoint, local saturation minimum, and local saturation maximum. Even further, as would be appreciated by persons of skill in the art, first-level saturating arithmetic units 410 can comprise two saturating arithmetic units to calculate the local midpoint, local saturation minimum, and local saturation maximum. For example, a first one of the two saturating arithmetic units can be used to calculate the local midpoint, while the second one of the two saturating arithmetic units can be used to calculate the local saturation minimum and the local saturation maximum in a sequential manner. The two saturating arithmetic units can perform these calculations in parallel.

As would be appreciated by a person of skill in the art, the multiple parallel pipelines and multiple execution units provided by a SIMD processing system are well suited for implementing the parallelized saturating accumulation methods described above.

Figure 5:
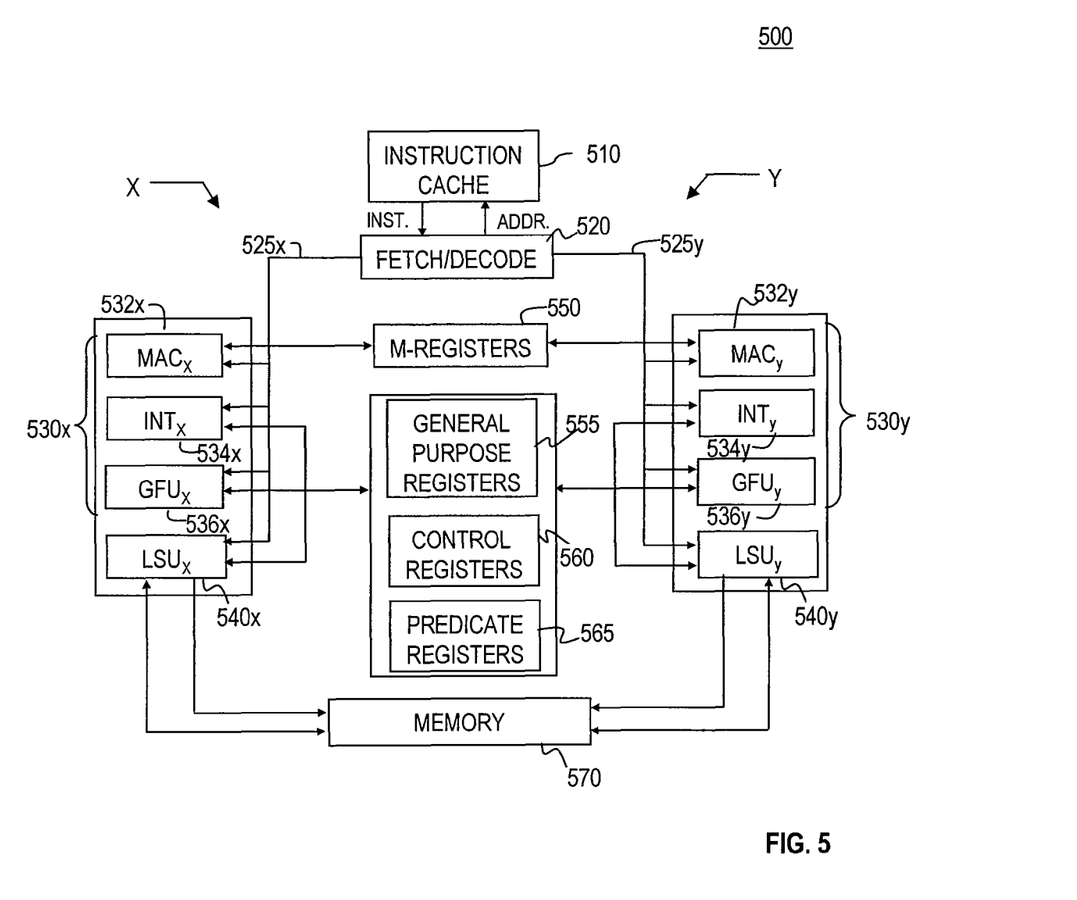
FIG. 5 illustrates an exemplary SIMD processor system.

FIG. 5 illustrates an exemplary SIMD processor system 500. In an embodiment, the processor system is a 64-bit long instruction word machine including at least two identical Single Instruction Multiple Data (SIMD) units. As would be appreciated by a person of skill in the art, other configurations for computer system 500 can be used with the present invention.

Processor system 500 includes an instruction cache 510 for receiving and holding instructions from a program memory (not shown). The instruction cache 510 is coupled to fetch/decode circuitry 520. The fetch/decode circuitry 520 issues addresses in the program memory from which instructions are to be fetched and receives on each fetch operation a 64 bit instruction from the cache 510 (or program memory). In addition, the fetch/decode circuitry 520 evaluates an opcode in an instruction and transmits control signals along channels 525$x$, 525$y$ to control the movement of data between designated registers and the Multiplier Accumulator (MAC) 532, Integer (INT) 534, Galois Field Unit (GFU) 536, and Load/Store Unit (LSU) 540 functional units.

Processor system 500 illustrates two SIMD execution units 530$x$, 530$y$. However, as would be appreciated by persons of skill in the art, the processor system can include additional execution units. In addition, the elements of the processor considered execution units can be different than illustrated in FIG. 5.

Each of the illustrated SIMD execution units 530$x$, 530$y$ includes a Multiplier Accumulator Unit (MAC) 532, an Integer Unit (INT) 534, and a Galois Field Unit (GFU) 536. Multiplier accumulator units 532$x$, 532$y$ perform the process of multiplication and addition of products commonly used in many digital signal processing algorithms. Integer units 534$x$, 534$y$ perform many common operations on integer values used in general computation and signal processing. Galois field units 536$x$, 536$y$ perform special operations using Galois field arithmetic such as can be executed in implementations of the Reed-Solomon error protection coding scheme.

Load/store units 540$x$, 540$y$ perform accesses to the data cache or RAM, either to load data values from the data cache/RAM into a general purpose register 555 or to store values to the data cache/RAM from a general purpose register 555.

Processor system 500 further includes a memory 570 coupled to the SIMD units. Although FIG. 5 depicts a memory, as would be appreciated by persons of skill in the art, other storage implementations can be used with the present invention.

Processor system 500 includes multiple registers (M-registers) 550 for holding multiply-accumulate results and multiple general purpose registers 555. In an embodiment, processor system 500 includes four M-registers and sixty-four general purpose registers. Processor system 500 also includes multiple control registers 360 and multiple predicate registers 565.

5. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing saturated accumulation of a sequence of values, comprising:
   dividing the sequence of values into a series of subsequences; and
   determining a local saturation minimum, local midpoint, and local saturation maximum, using parallel hardware, for a first subsequence in the series of subsequences, wherein:
      the local saturation minimum for the first subsequence is determined via a saturating addition of a global saturation minimum and a plurality of values in the first subsequence,
      the local midpoint via for the first subsequence is determined via a saturating addition of the plurality of values in the first subsequence, and
      the local saturation maximum for the first subsequence is determined via a saturating addition of a global saturation maximum and the plurality of values in the first subsequence.

2. The method of claim 1, further comprising:
   determining an accumulation total for the first subsequence via a saturating addition of an accumulation total for an immediately prior subsequence and the local midpoint of the first subsequence,
   wherein the local saturation minimum and local saturation maximum of the first subsequence are used to define the saturation range for the saturating addition, of the accumulation total for the immediately prior subsequence and the local midpoint of the first subsequence.

3. The method of claim 1, further comprising:
   determining a subtotal subsequence local saturation minimum, subtotal subsequence local midpoint, and subtotal subsequence local saturation maximum, using the parallel hardware, for the first subsequence and a second subsequence in the series of subsequences, wherein:
      the subtotal subsequence local saturation minimum is determined via a saturating addition of the local saturation minimum of the first subsequence and a local midpoint of the second subsequence,
      the subtotal subsequence local midpoint is determined via a saturating addition of the local midpoint of the first subsequence and the local midpoint of the second subsequence, and
      the subtotal subsequence local saturation maximum is determined via a saturating addition of the local saturation maximum of the first subsequence and the local midpoint of the second subsequence.

4. The method of claim 3, wherein the subtotal subsequence local saturation minimum calculation saturates to a range defined by the local saturation minimum and the local saturation maximum of the second subsequence.

5. The method of claim 3, wherein the subtotal subsequence local midpoint calculation saturates to a range defined by the difference between the global saturation minimum and the global saturation maximum and the difference between the global saturation maximum and the global saturation minimum.

6. The method of claim 3, wherein the subtotal subsequence local saturation maximum calculation saturates to a range defined by the local saturation minimum of the second subsequence and the local saturation maximum of the second subsequence.

7. The method of claim 3, wherein at least two of the subtotal subsequence local saturation, minimum, subtotal subsequence local midpoint, and subtotal subsequence local saturation maximum are determined substantially in parallel.

8. The method of claim 3, wherein the subtotal subsequence local saturation, minimum, subtotal subsequence local midpoint, and subtotal subsequence local saturation maximum are determined in software executing on the parallel hardware.

9. The method of claim 1, wherein a saturation range for both the saturating addition used to determine the local saturation minimum and the saturating addition used to determine the local saturation maximum is defined by the global saturation minimum and the global saturation maximum.

10. The method of claim 1, wherein a saturation range for the saturating addition used to determine the local midpoint is defined by the difference between the global saturation minimum and the global saturation maximum and the difference between the global saturation maximum and the global saturation minimum.

11. The method of claim 1, further comprising, for an initial subsequence, determining a local midpoint for the initial subsequence via a saturating addition of a plurality of values in the initial subsequence.

12. The method of claim 1, wherein the local saturation minimum, local midpoint, and local saturation maximum for the first subsequence are determined substantially in parallel with a local saturation minimum, local midpoint, and local saturation maximum for a second subsequence in the, series of subsequences.

13. The method of claim 1, further comprising:
providing a first saturating multiply-accumulate instruction using saturating arithmetic, MAC acc, x, y, to a processing unit to determine the local saturation minimum for the first subsequence, wherein the product of x and y is a value in the first subsequence.

14. The method of claim 13, further comprising:
providing a second saturating multiply-accumulate instruction using saturating arithmetic, MAC acc, x, y, to a processing unit to determine the local midpoint for the first subsequence, wherein the product of x and y is a value in the first subsequence.

15. The method of claim 14, further comprising:
providing a third saturating multiply-accumulate instruction using saturating arithmetic, MAC acc, x, y, to a processing unit to determine the local minimum for the first subsequence, wherein the product of x and y is a value in the first subsequence.

16. The method of claim 1, wherein at least two of the local saturation minimum, the local midpoint and the local saturation maximum are determined substantially in parallel.

17. The method of claim 1, wherein the local saturation minimum the local midpoint and the local saturation maximum are determined in software executing on the parallel hardware.

18. A system for performing a saturated accumulation of a sequence having a plurality of sequential subsequences, comprising:

a plurality of sets of first-level saturating arithmetic units, wherein each set of first-level saturating arithmetic units receives a different subsequence, wherein each set of first-level saturating arithmetic units includes:
a saturating arithmetic unit configured to perform the saturating addition of a global saturation minimum and the values of the subsequence to determine a local saturation minimum,
a saturating arithmetic unit configured to perform the saturating addition of the values of the subsequence to determine a local midpoint, and
a saturating arithmetic unit configured to perform the saturating addition of a global saturation maximum and the values of the subsequence to determine a local saturation maximum.

19. The system of claim 18, further comprising:
a plurality of second-level saturating arithmetic units operating on the subsequences in order, wherein each second-level arithmetic unit is configured to perform the saturating addition of an accumulation total of one or more prior subsequences and a local midpoint of a current subsequence, wherein the saturation range for the saturating addition is defined by the local saturation minimum and local saturation maximum of the current subsequence.

20. The system of claim 19, further comprising:
a saturating arithmetic unit configured to perform the saturating addition of an initial subsequence to determine the local midpoint for the initial subsequence.

21. The system of claim 19, wherein the accumulation total is initialized to the local midpoint for the initial subsequence.

22. The system of claim 18, further comprising:
a second-level saturating arithmetic unit comprising:
a saturating arithmetic unit configured to perform the saturating addition of a local saturation minimum of a first subsequence and a local midpoint of a second subsequence to determine a subtotal subsequence local saturation minimum,
a saturating arithmetic unit configured to perform the saturating addition of a local midpoint of the first subsequence and the local midpoint of the second subsequence to determine a subtotal subsequence local midpoint, and
a saturating arithmetic unit configured to perform the saturating addition of a local saturation maximum of the first subsequence and the local midpoint of the second subsequence to determine a subtotal subsequence local saturation maximum.

23. The system of claim 22, wherein the second-level saturating arithmetic unit operates substantially in parallel with another second-level saturating arithmetic unit.

24. The system of claim 18, wherein the saturation range for the saturating additions performed to determine the local saturation minimum and the local saturation maximum is defined by the global saturation minimum and the global saturation maximum.

25. The system of claim 18, wherein the saturation range for the saturating addition performed to determine the local midpoint is defined by the difference between the global saturation minimum and the global saturation maximum and the difference between the global saturation maximum and the global saturation minimum.

26. The system of claim 18, wherein the first-level saturating arithmetic units are multiply-accumulators.

27. The system of claim 18, wherein at least two sets of first-level saturating arithmetic units operate substantially in parallel.

* * * * *

UNITED STATES PATENT AND TRADEMARK OFFICE
CERTIFICATE OF CORRECTION

| | |
|---|---|
| PATENT NO. | : 8,495,117 B2 |
| APPLICATION NO. | : 12/405868 |
| DATED | : July 23, 2013 |
| INVENTOR(S) | : Alexander J. Burr |

It is certified that error appears in the above-identified patent and that said Letters Patent is hereby corrected as shown below:

In the Claims:

Column 14, Line 43, please replace "addition, of" with --addition of--.

Column 15, Line 13, please replace "saturation, minimum" with --saturation minimum--.

Column 15, Line 17, please replace "saturation, minimum" with --saturation minimum--.

Column 15, Line 38, please replace "in the, series" with --in the series--.

Column 15, Line 61, please replace "minimum the local midpoint and" with --minimum, the local midpoint, and--.

Signed and Sealed this
Fifteenth Day of October, 2013

Teresa Stanek Rea
*Deputy Director of the United States Patent and Trademark Office*